United States Patent [19]

Takazawa

[11] 4,313,647
[45] Feb. 2, 1982

[54] NONREFLECTIVE COATING

[75] Inventor: Eiichi Takazawa, Kokubunji, Japan

[73] Assignee: Mamiya Koki Kabushiki Kaisha, Japan

[21] Appl. No.: 109,063

[22] Filed: Jan. 2, 1980

Related U.S. Application Data

[63] Continuation of Ser. No. 752,000, Dec. 17, 1976, abandoned.

[30] Foreign Application Priority Data

Dec. 23, 1975 [JP] Japan .................. 50-153603
Dec. 23, 1975 [JP] Japan .................. 50-153604

[51] Int. Cl.$^3$ .................................. G02B 1/10
[52] U.S. Cl. ............................ 350/164; 428/332
[58] Field of Search .............. 428/332, 333; 350/163, 350/164, 165, 166

[56] References Cited

U.S. PATENT DOCUMENTS

| | | | |
|---|---|---|---|
| 3,185,020 | 5/1965 | Thelen | 350/164 |
| 3,799,653 | 3/1974 | Ikeda | 350/164 |
| 3,829,197 | 8/1974 | Thelen | 350/164 |
| 3,858,965 | 1/1975 | Sumita | 350/164 |
| 3,922,068 | 11/1975 | Uetsuki | 350/164 |

FOREIGN PATENT DOCUMENTS 1380793 1/1975 United Kingdom ............. 350/164

*Primary Examiner*—John D. Lee
*Attorney, Agent, or Firm*—Robert E. Burns; Emmanuel J. Lobato; Bruce L. Adams

[57] ABSTRACT

A nonreflective coating is made up of five or seven layers of optical films provided on an optical element, such as a lens, whose refractive index is in a certain refractive index range for a particular light wavelength. The layers are formed of two materials different in refractive index so that the odd layers have one of the two refractive indexes while the even layers have the other refractive index, and the thicknesses of the layers are suitably defined as functions of the light wavelength.

2 Claims, 16 Drawing Figures

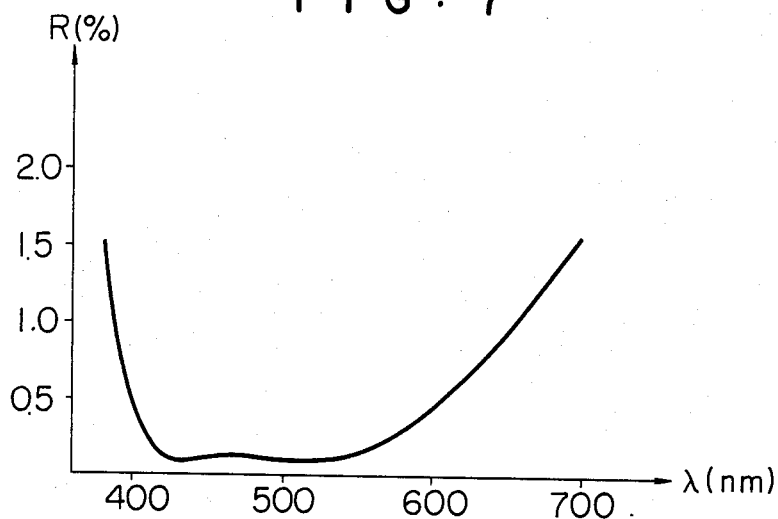
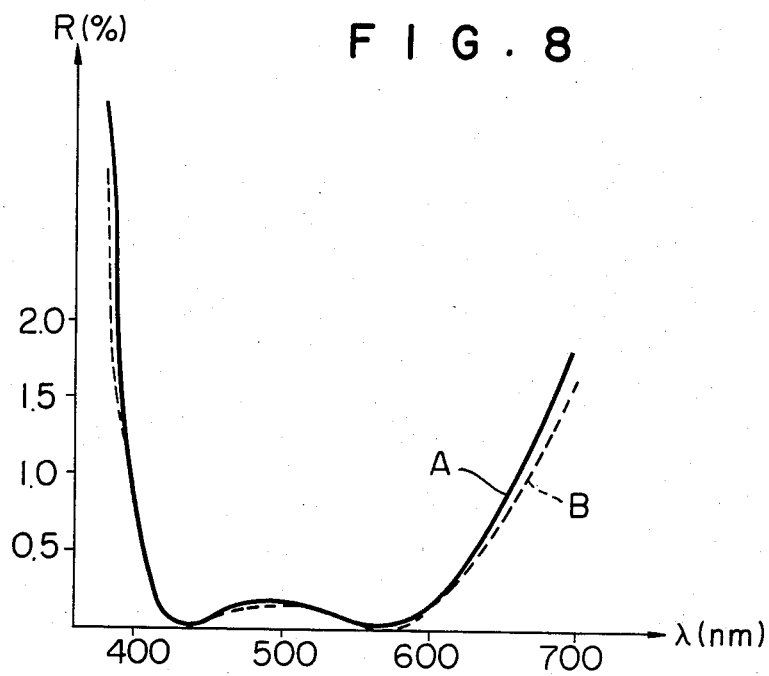

NONREFLECTIVE COATING

This is a continuation of application Ser. No. 752,000, filed Dec. 17, 1976 and now abandoned.

BACKGROUND OF THE INVENTION

This invention relates to nonreflective coatings, and more particularly to nonreflective coatings applied to optical elements such as lenses.

A nonreflective coating based on the interference of equal inclination is well known in the art, and such a nonreflective coating is applied to optical elements such as lenses (hereinafter referred to as "optical substrates" or simply "substrates" when applicable). The nonreflective coating of this type comprises three layers of optical films, or simply films (as in U.S. Pat. No. 3,185,020, and Japanese Patent Publication No. 28821/1975), and is disadvantageous in the following points.

(1) It is necessary to provide three different films which have high, middle, and low refractive indexes, respectively, on a substrate, and (2) furthermore it is necessary to change the refractive indexes of the three films, especially the refractive index of the film with the middle refractive index if the refractive index of the substrate is changed. The number in kind of materials which can satisfy these requirements is of the order of three if the reproducibility thereof is taken into consideration.

(3) The films are deposited, for instance, by vacuum evaporation. In this case, the film thus deposited is liable to be nonuniform in refractive index, and accordingly the reflection preventing effect thereof for the central part of the visible ray range is greatly deviated from the design value.

(4) It is very important in the field of photographical technique that such films show high transmissivity with respect to light in the near ultraviolet ray range. However, due to the above-described nonuniformity, a film made of a certain material may absorb a large part of the near ultraviolet rays at its thick portion.

In addition, (5) in order to eliminate the above-described nonuniformity, a method has been proposed in which gas such as oxygen or air is employed in depositing the films by vacuum evaporation. However, this method is disadvantageous in that the film formed thereby is insufficient in strength.

SUMMARY OF THE INVENTION

Accordingly, an object of this invention is to provide a nonreflective coating in which all of the above-described difficulties accompanying a conventional nonreflective coating have been eliminated.

More specifically, an object of the invention is to provide a nonreflective coating which is made of a relatively small number of materials different in refractive index and is applicable to a substrate whose refractive index is in a relatively wide refractive index range, showing an excellent reflection preventing effect over a wide range of light wavelength.

The novel features believed characteristic of this invention are set forth in the appended claims. This invention itself, however, as well as other objects and advantages thereof may best be understood by reference to the following detailed description of illustrative embodiments, when read in conjunction with the accompanying drawings.

BRIEF DESCRIPTION OF THE DRAWINGS

In the accompanying drawings:

FIGS. 2 through 8 are graphical representations indicating the reflection preventing effects of various concrete examples according to the first embodiment shown in FIG. 1;

DETAILED DESCRIPTION OF THE INVENTION

Figure 1:
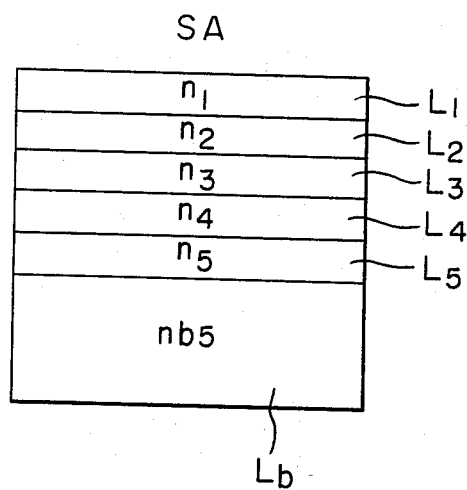
FIG. 1 is an explanatory diagram illustrating a first embodiment of a nonreflective coating according to this invention.

In order to eliminate the above-described difficulties (1) and (2) accompanying the conventional non-reflective coating made up of three layers of optical films, a first embodiment of a non-reflective coating according to this invention, as shown in FIG. 1, comprises five layers of films $L_1$ through $L_5$ which are formed on an optical substrate $L_b$ such as a lens in the order opposite to the stated order. More specifically, the first film $L_1$ has a surface exposed to the surrounding atmosphere SA, while the fifth film $L_5$ is deposited directly on the substrate $L_b$, and the remaining films $L_2$, $L_3$ and $L_4$ are disposed between the first and fifth films $L_1$ and $L_5$. In FIG. 1, the refractive indexes of the films $L_1$ through $L_5$ and the substrate $L_b$ are designated by $n_1$, $n_2$, $n_3$, $n_4$, $n_5$ and $n_{b5}$, respectively.

The films $L_1$ through $L_5$ are formed of two materials different in refractive index. More specifically, the odd numbered films, i.e. the first, third and fifth films $L_1$, $L_3$ and $L_5$ are made of a material having a low refractive index such as magnesium fluoride $MgF_2$ whose refractive index is 1.39.

In this case, the films $L_1$, $L_3$ and $L_5$ are effective when the optical thicknesses $d_1$, $d_3$ and $d_5$ thereof satisfy the following limitations:

$$d_1 \geq \frac{\lambda_o}{4}$$

$$d_5 \leq \frac{\lambda_o}{5}$$

where $\lambda_o$ is the light wavelength.

It should be noted that the optical thickness of the film $L_5$ deposited on the substrate $L_b$ is determined from the refractive index $n_{b5}$ of the material of the substrate $L_b$.

On the other hand, the second and fourth films $L_2$ and $L_4$ are made of a material having a high refractive index such as zirconium oxide $ZrO_2$, titanium oxide $TiO_2$, or cerium oxide $CeO_2$. In this case, similarly as in the above-described case, the films $L_2$ and $L_4$ are effective when the optical thicknesses $d_2$ and $d_4$ thereof satisfy the following limitations:

$$\text{each of } d_2 \text{ and } d_4 \leq \frac{\lambda_o}{4}$$

$d_2$ is substantially equal to $d_4$.

Optical thickness calculations are carried out by the Herpin matrix method which is described in U.S. Pat. No. 3,799,653 at columns 5-7 of the patent. The Herpin matrix method is also described in the book "Thin-Film Optical Filters" by H. A. Macleod, Adam Hilger Ltd., London.

According to the concerned experiments, it is especially preferable in the case of five layers of operating films that the refractive index $n_{b5}$ of the substrate $L_b$ is in the range of from 1.65 to 1.90 i.e. $1.65 \leq n_{b5} \leq 1.90$.

The relationships between the film thicknesses and the refractive indexes described above will be further described by reference to concrete examples in which the above-described wavelength $\lambda_o$ is employed.

EXAMPLE 1-1

Figure 2:
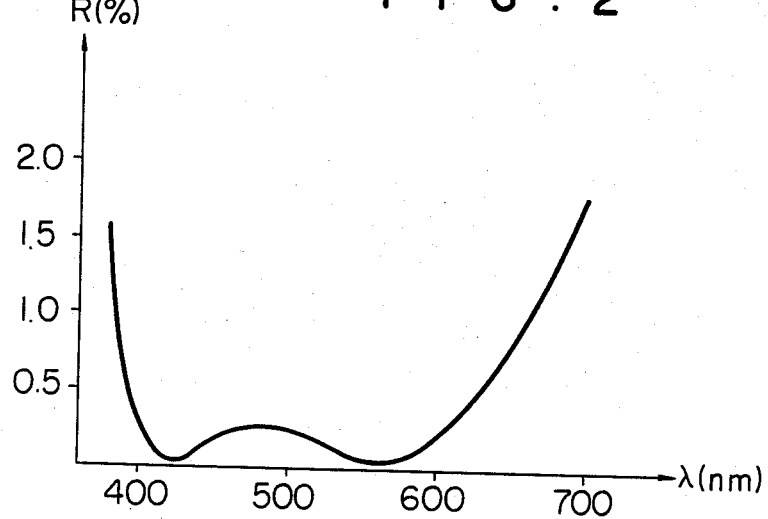

When on a substrate $L_b$ having a refractive index $n_{b5}=1.65$ were deposited five layers of films $L_1$–$L_5$ made of two different materials so that the refractive indexes $n_1$, $n_2$, $n_3$, $n_4$ and $n_5$ thereof are respectively 1.39, 2.00, 1.39, 2.00 and 1.39 and that the optical thicknesses $d_1$, $d_2$, $d_3$, $d_4$ and $d_5$ thereof are respectively 0.270 $\lambda_o$, 0.210 $\lambda_o$, 0.055 $\lambda_o$, 0.173 $\lambda_o$ and 0.037 $\lambda_o$, the variation of reflectivity R(%) with wavelength $\lambda$ (nm) was as indicated in FIG. 2.

EXAMPLE 1-2

Figure 3:
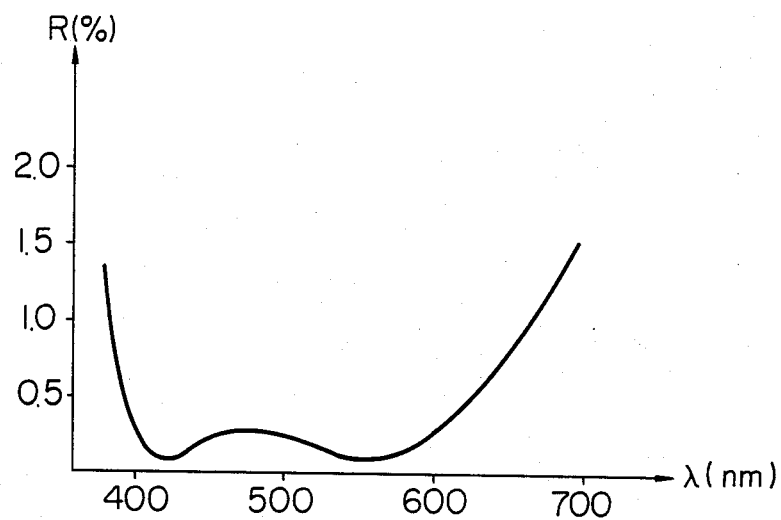

In the case where on a substrate $L_b$ having a refractive index of $n_{b5}=1.75$ are formed five layers of films $L_1$–$L_5$ made of two different materials so that the refractive indexes $n_1$, $n_2$, $n_3$, $n_4$ and $n_5$ thereof are respectively 1.39, 2.00, 1.39, 2.00, and 1.39 and that the optical thicknesses $d_1$, $d_2$, $d_3$, $d_4$ and $d_5$ thereof are respectively 0.274 $\lambda_o$, 0.178 $\lambda_o$, 0.059 $\lambda_o$, 0.179 $\lambda_o$ and 0.032 $\lambda_o$, the variation of reflectivity R(%) with wavelength $\lambda$ (nm) was as indicated in FIG. 3.

EXAMPLE 1-3

Figure 4:
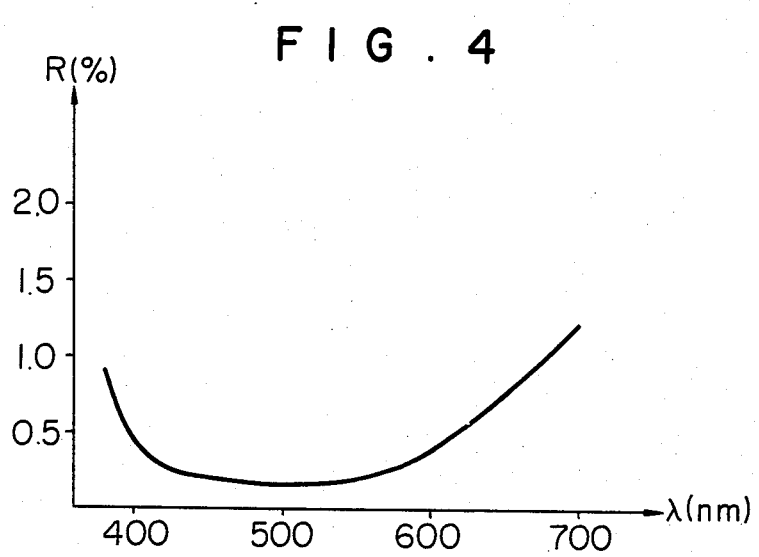

In the case where for a substrate $L_b$ having a refractive index $n_{b5}=1.90$ two different materials were selected to form five layers of films $L_1$–$L_5$ whose refractive indexes $n_1$, $n_2$, $n_3$, $n_4$ and $n_5$ are 1.39, 2.00, 1.39, 2.00 and 1.39, respectively, and the optical thicknesses $d_1$, $d_2$, $d_3$, $d_4$ and $d_5$ thereof were made 0.283 $\lambda_o$, 0.171 $\lambda_o$, 0.042 $\lambda_o$, 0.214 $\lambda_o$ and 0.010 $\lambda_o$, respectively, the variation of reflectivity R(%) with wavelength $\lambda$ (nm) was as indicated in FIG. 4.

EXAMPLE 1-4

Figure 5:
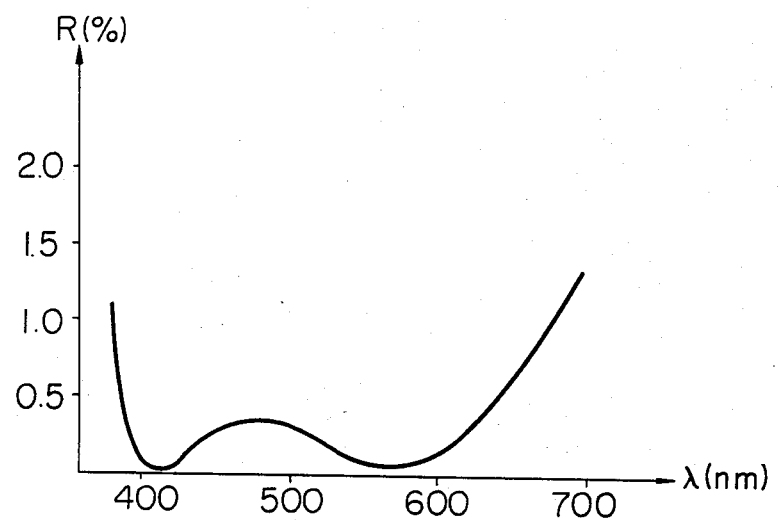

For a substrate $L_b$ having a refractive index 1.65, two different materials were selected to form five layers of films $L_1$, $L_2$, $L_3$, $L_4$ and $L_5$ having refractive indexes $n_1=1.39$, $n_2=2.30$, $n_3=1.39$, $n_4=2.30$ and $n_5=1.39$, respectively, and optical thicknesses $d_1=0.320$ $\lambda_o$, $d_2=0.120$ $\lambda_o$, $d_3=0.125$ $\lambda_o$, $d_4=0.111$ $\lambda_o$ and $d_5=0.065$ $\lambda_o$ respectively. In this case, the variation of reflectivity R(%) with wavelength $\lambda$ (nm) was as indicated in FIG. 5.

EXAMPLE 1-5

Figure 6:
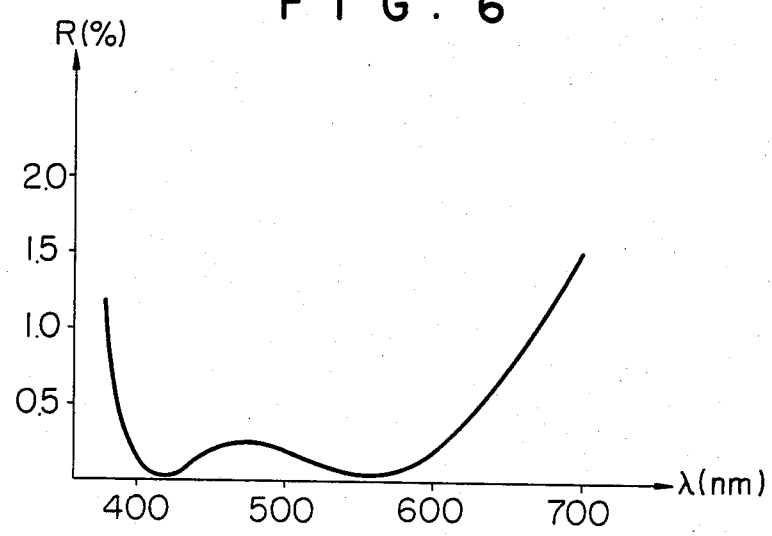

In the case of a substrate $L_b$ having a refractive index of 1.75, five layers of films $L_1$, $L_2$, $L_3$, $L_4$ and $L_5$ having refractive indexes $n_1=1.39$, $n_2=2.30$, $n_3=1.39$, $n_4=2.30$ and $n_5=1.39$ and optical thicknesses $d_1=0.312$ $\lambda_o$, $d_2=0.133$ $\lambda_o$, $d_3=0.108$ $\lambda_o$, $d_4=0.132$ $\lambda_o$ and $d_5=0.054$ $\lambda_o$, respectively, were formed by using two different materials. The resultant variation of reflectivity R(%) with wavelength $\lambda$ (nm) was as shown in FIG. 6.

EXAMPLE 1-6

In the case of a substrate $L_b$ having a refractive index $n_{b5}=1.90$, two different materials were selected to form five layers of films $L_1$, $L_2$, $L_3$, $L_4$ and $L_5$ having refractive indexes $n_1=1.39$, $n_2=2.30$, $n_3=1.39$, $n_4=2.30$ and $n_5=1.39$ and optical thicknesses $d_1=0.294$ $\lambda_o$, $d_2=0.120$ $\lambda_o$, $d_3=0.096$ $\lambda_o$, $d_4=0.130$ $\lambda_o$ and $d_5=0.040$ $\lambda_o$, respectively. The resultant variation of reflectivity R(%) with wavelength $\lambda$ (nm) was as indicated in FIG. 7.

EXAMPLE 1-7

In the case where with respect to a substrate $L_b$ having a refractive index $n_{b5}=1.72$ two different materials were employed to form five layers of films $L_1$, $L_2$, $L_3$, $L_4$ and $L_5$ having refractive indexes $n_1=1.39$, $n_2=2.10$, $n_3=1.39$, $n_4=2.10$ and $n_5=1.39$ respectively and optical thicknesses $d_1=0.273$ $\lambda_o$, $d_2=0.200$ $\lambda_o$, $d_3=0.054$ $\lambda_o$, $d_4=0.183$ $\lambda_o$ and $d_5=0.031$ $\lambda_o$, respectively, the variation of reflectivity (R(%)) with wavelength $\lambda$ (nm) was as indicated by the solid line A in FIG. 8, and is very similar to the curve B obtained by calculation.

Figure 9:
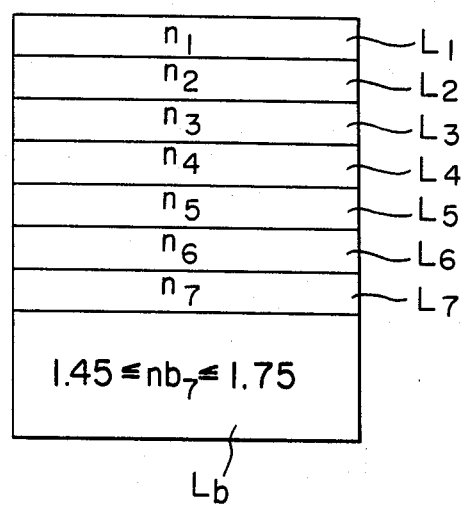
FIG. 9 is an explanatory diagram illustrating a second embodiment of the nonreflective coating according to the invention.

A second embodiment of the nonreflective coating according to this invention, as shown in FIG. 9, comprises seven layers of optical films $L_1$ through $L_7$ which, similarly as in the first embodiment, are formed on an optical substrate $L_b$ such as a lens in the order opposite to the described order. More specifically, the first film $L_1$ has a surface exposed to the surrounding atmosphere SA, while the lowermost or seventh film $L_7$ is deposited directly on the substrate $L_b$, and the second film $L_2$ through the sixth film $L_6$ are arranged between the first and seventh films $L_1$ and $L_7$. The refractive indexes of the films $L_1$ through $L_7$ and the substrate $L_b$ are designated by $n_1$, $n_2$, $n_3$, $n_4$, $n_5$, $n_6$, $n_7$ and $n_{b7}$, respectively, in FIG. 9.

Similarly, as in the first embodiment, the nonreflective coating is made up of the films classified into two groups different in refractive index. More specifically, the first, third, fifth and seventh films $L_1$, $L_3$, $L_5$ and $L_7$ are made of a material with a low refractive index such as magnesium fluoride $MgF_2$ whose refractive index is n= 1.39.

The first, third, fifth and seventh films $L_1$, $L_3$, $L_5$ and $L_7$ are effective, when the optical thicknesses $d_1$, $d_3$, $d_5$ and $d_7$ thereof satisfy the following limitations.

$$d_1 \geq \frac{\lambda_o}{4}$$

$$\text{each of } d_3, \ d_5 \text{ and } d_7 \leq \frac{\lambda_o}{5},$$

where $\lambda_o$ is the light wavelength.

In addition, the optical thickness of the seventh film $L_7$ is determined from the refractive index $n_{b7}$ of the material of the substrate $L_b$.

On the other hand, the second, fourth and sixth films $L_2$, $L_4$ and $L_6$ are made of a material having a high refractive index such as zirconium oxide $ZrO_2$, titanium oxide $TiO_2$, or cerium oxide $CeO_2$. Similarly as in the above-described case, these second, fourth and sixth films $L_2$, $L_4$ and $L_6$ are effective when the optical thicknesses $d_2$, $d_4$ and $d_6$ thereof satisfy the following limitations:

$$\text{Each of } d_2, d_4 \text{ and } d_6 \leq \frac{\lambda_o}{4}$$

$d_2$ is substantially equal to $d_4$. In addition, the optical thickness $d_6$ of the sixth film $L_6$ is determined essentially from the refractive index $L_{b7}$ of the substrate $L_b$.

According to the concerned experiments, it is especially preferable in the case of seven layers of films that the refractive index $n_{b7}$ of the substrate $L_b$ is in the range of from 1.45 to 1.75, i.e. $1.45 \leq n_{b5} \leq 1.75$.

Now, the relationships between the film optical thicknesses and the refractive indexes in the second embodiment will be further described with reference to concrete examples in which the above-described wavelength $\lambda_o$ is employed.

EXAMPLE 2-1

Figure 10:
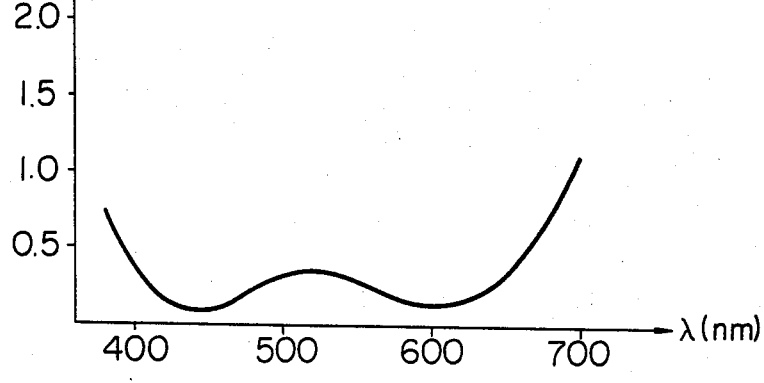
FIGS. 10 through 16 are graphical representations indicating the reflection preventing effects of various concrete examples according to the second embodiment shown in FIG. 9.

In the case where for a substrate $L_b$ having a refractive index $n_{b7} = 1.45$ two different materials were selected to form seven layers of films $L_1$–$L_7$ whose refractive indexes $n_1$, $n_2$, $n_3$, $n_4$, $n_5$, $n_6$ and $n_7$ are 1.39, 2.00, 1.39, 2.00, 1.39, 2.00 and 1.39 respectively, and whose optical thicknesses $d_1$, $d_2$, $d_3$, $d_4$, $d_5$, $d_6$ and $d_7$ were made $0.250\lambda_o$, $0.207\lambda_o$, $0.029\lambda_o$, $0.204\lambda_o$, $0.094\lambda_o$, $0.060\lambda_o$ and $0.076\lambda_o$, respectively, the variation of reflectivity R(%) with wavelength λ (nm) was as indicated in FIG. 10.

EXAMPLE 2-2

Figure 11:
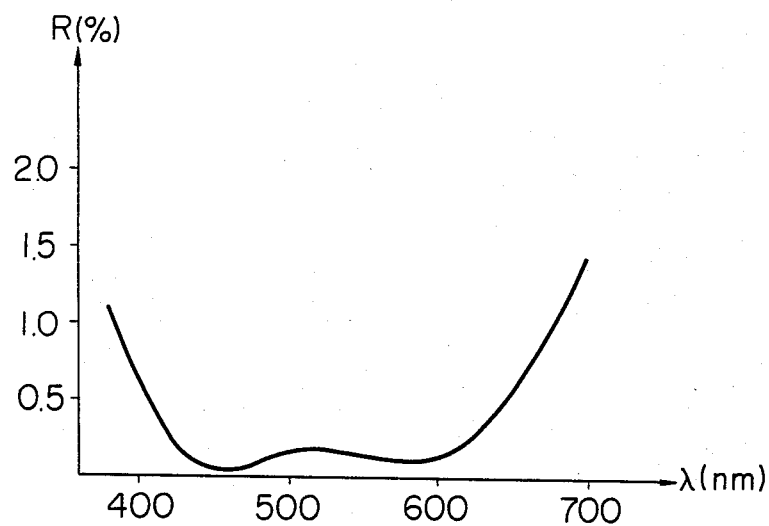

On a substrate $L_b$ having a refractive index $n_{b7} = 1.65$, seven layers of films $L_1$ through $L_7$ were formed of two materials different in refractive index, so that these films $L_1$ through $L_7$ had refractive indexes $n_1 = 1.39$, $n_2 = 2.00$, $n_3 = 1.39$, $n_4 = 2.00$, $n_5 = 1.39$, $n_6 = 2.00$ and $n_7 = 1.39$, respectively, and optical thicknesses $d_1 = 0.268\lambda_o$, $d_2 = 0.212\lambda_o$, $d_3 = 0.036\lambda_o$, $d_4 = 0.212\lambda_o$, $d_5 = 0.090\lambda_o$, $d_6 = 0.100\lambda_o$ and $d_7 = 0.070\lambda_o$, respectively. In this case, the variation of reflectivity R(%) with wavelength λ (nm) was as indicated in FIG. 11.

EXAMPLE 2-3

Figure 12:
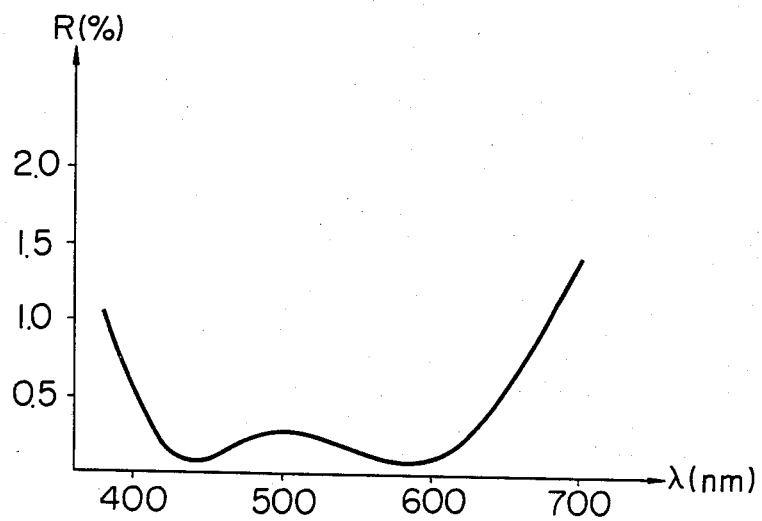

On a substrate $L_b$ having a refractive index $n_{b7} = 1.75$, seven layers of films $L_1$ through $L_2$ were formed of two materials different in refractive index so that these films had refractive indexes $n_1 = 1.39$, $n_2 = 2.00$, $n_3 = 1.39$, $n_4 = 2.00$, $n_5 = 1.39$, $n_6 = 2.00$ and $n_7 = 1.39$, respectively, and also optical thicknesses $d_1 = 0.284\lambda_o$, $d_2 = 0.189\lambda_o$, $d_3 = 0.051\lambda_o$, $d_4 = 0.203\lambda_o$, $d_5 = 0.084\lambda_o$, $d_6 = 0.121\lambda_o$ and $d_7 = 0.121\lambda_o$, respectively. In this case, the variation of reflectivity R(%) with wavelength λ (nm) was as indicated in FIG. 12.

EXAMPLE 2-4

In this example, the refractive index $n_{b7}$ of a substrate $L_b$ was 1.45, and two materials different in refractive index were employed to form seven layers of films $L_1$ through $L_7$ on the substrate $L_b$ as shown in FIG. 9. The refractive indexes $n_1$ through $n_7$ and optical thicknesses $d_1$ through $d_7$ of the films $L_1$ through $L_7$ were as listed below.

| | |
|---|---|
| $n_1 = 1.39$ | $d_1 = 0.268\lambda_o$ |
| $n_2 = 2.30$ | $d_2 = 0.166\lambda_o$ |
| $n_3 = 1.39$ | $d_3 = 0.057\lambda_o$ |
| $n_4 = 2.30$ | $d_4 = 0.187\lambda_o$ |
| $n_5 = 1.39$ | $d_5 = 0.115\lambda_o$ |
| $n_6 = 2.30$ | $d_6 = 0.055\lambda_o$ |
| $n_7 = 1.39$ | $d_7 = 0.102\lambda_o$ |

Figure 13:
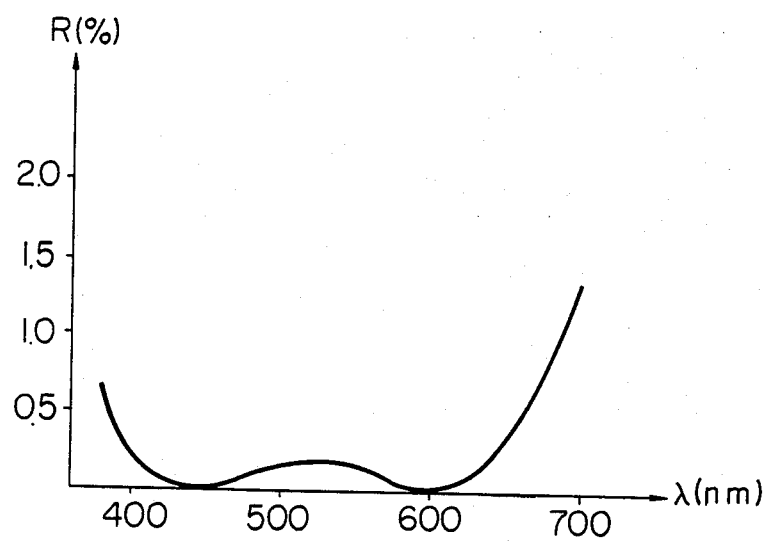

In this case, the variation of reflectivity R(%) with wavelength λ (nm) was as indicated in FIG. 13.

EXAMPLE 2-5

In this example, the refractive index $n_{b7}$ of a substrate was 1.65, and two materials different in refractive index were employed to form seven layers of films $L_1$ through $L_7$ on the substrate $L_b$ as shown in FIG. 9. The refractive indexes $n_1$ through $n_7$ and optical thicknesses $d_1$ through $d_7$ of the seven films $L_1$ through $L_7$ were as listed below.

| | |
|---|---|
| $n_1 = 1.39$ | $d_1 = 0.302\lambda_o$ |
| $n_2 = 2.30$ | $d_2 = 0.137\lambda_o$ |
| $n_3 = 1.39$ | $d_3 = 0.100\lambda_o$ |
| $n_4 = 2.30$ | $d_4 = 0.145\lambda_o$ |
| $n_5 = 1.39$ | $d_5 = 0.133\lambda_o$ |
| $n_6 = 2.30$ | $d_6 = 0.073\lambda_o$ |
| $n_7 = 1.39$ | $d_7 = 0.085\lambda_o$ |

Figure 14:
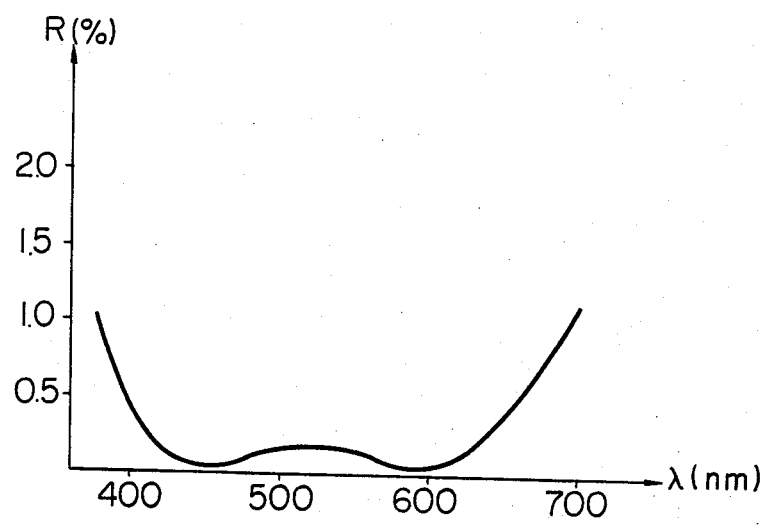

In this case, the variation of reflectivity R(%) with wavelength λ (nm) was as represented by the curve in FIG. 14.

EXAMPLE 2-6

Two materials different in refractive index were employed to form seven layers of films $L_1$ through $L_7$ on a substrate $L_b$ having a refractive index $n_{b7} = 1.75$. The refractive indexes $n_1$ through $n_7$ and optical thicknesses $d_1$ through $d_7$ of the films $L_1$ through $L_7$ were as listed below.

| | |
|---|---|
| $n_1 = 1.39$ | $d_1 = 0.270\lambda_o$ |
| $n_2 = 2.30$ | $d_2 = 0.164\lambda_o$ |
| $n_3 = 1.39$ | $d_3 = 0.059\lambda_o$ |
| $n_4 = 2.30$ | $d_4 = 0.198\lambda_o$ |
| $n_5 = 1.39$ | $d_5 = 0.102\lambda_o$ |
| $n_6 = 2.30$ | $d_6 = 0.091\lambda_o$ |
| $n_7 = 1.39$ | $d_7 = 0.077\lambda_o$ |

Figure 15:
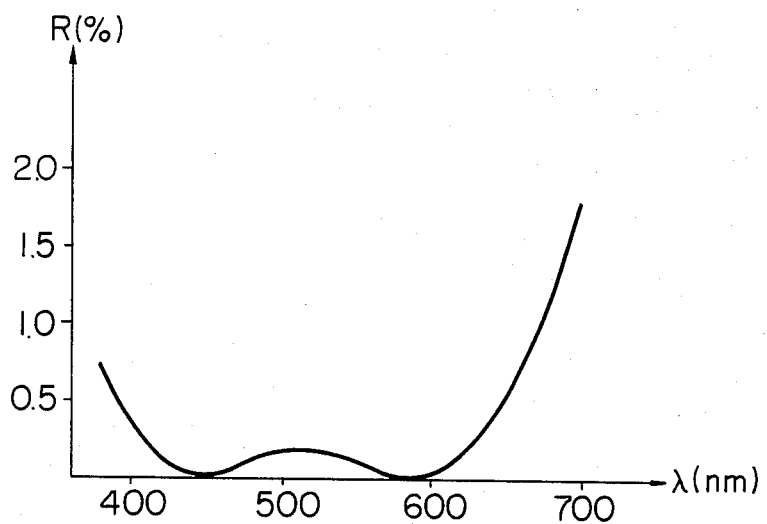

In this example, the variation of reflectivity R(%) with wavelength λ (nm) was as indicated in FIG. 15.

EXAMPLE 2-7

In this example also, two materials different in refractive index were employed to form seven layers of films $L_1$ through $L_7$ on a substrate $L_b$ having a refractive index $n_{b7} = 1.75$, as shown in FIG. 9. The refractive indexes $n_1$ through $n_7$ and optical thicknesses $d_1$ through $d_7$ of the films $L_1$ through $L_7$ were as listed below:

| | |
|---|---|
| $n_1 = 1.39$ | $d_1 = 0.268\lambda_o$ |
| $n_2 = 2.10$ | $d_2 = 0.188\lambda_o$ |
| $n_3 = 1.39$ | $d_3 = 0.046\lambda_o$ |
| $n_4 = 2.10$ | $d_4 = 0.200\lambda_o$ |
| $n_5 = 1.39$ | $d_5 = 0.104\lambda_o$ |
| $n_6 = 2.10$ | $d_6 = 0.072\lambda_o$ |
| $n_7 = 1.39$ | $d_7 = 0.082\lambda_o$ |

Figure 16:
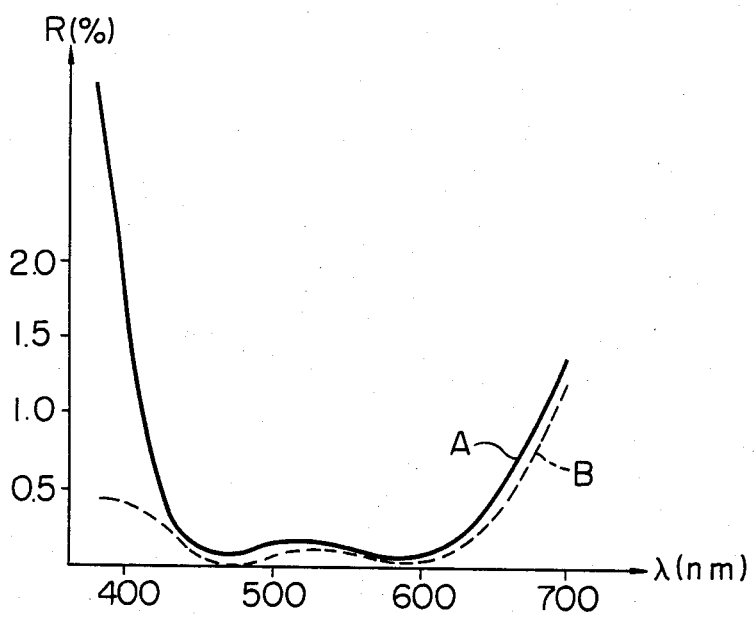

In this case, the variation of reflectivity R(%) with wavelength λ (nm) was as indicated by the curve A in FIG. 16. This curve A is very similar to the curve B obtained by calculation.

In the above-described examples, all of the films having a higher refractive index are less than 100 nm in thickness. According to the experiments, it has been found that with the film thickness of this order, no nonuniformity in refractive index is caused. Therefore, it is preferable that the nonreflective coating is made as described above, in order to eliminate the difficulties (3), (4) and (5) accompanying the conventional nonreflective coating. During the formation of the films having the thicknesses as described above by vacuum evaporation, no introduction of gas is required, and accordingly strong films can be formed by vacuum evaporation at a sufficiently high degree of vacuum.

As is apparent from the above description, the thicknesses of five or seven layers of films are so designed that the nonreflective coating made up of these films is applicable to a substrate whose refractive index is within a wide refractive index range. Furthermore, the films are formed of a relatively small number of materials different in refractive index. Thus, the nonreflective coating according to this invention shows an excellent reflection preventing effect over a wide range of light wavelengths.

What is claimed is:

1. A multi-layer nonreflective optical coating on an optical substrate, comprising: five optical film layers, respectively comprised of a first material having a first index of refraction and a second material having a second index of refraction higher than said first index of refraction, superposed and disposed in contact in the following order;

a first layer of the first material having an optical thickness $d_1$, wherein $0.270\lambda \leq d_1 \leq 0.320\lambda$;

a second layer of the second material having an optical thickness $d_2$, wherein $0.120\lambda \leq d_2 \leq 0.210\lambda$;

a third layer of the first material having an optical thickness of $d_3$, wherein $0.042\lambda \leq d_3 \leq 0.125\lambda$;

a fourth layer of the second material having an optical thickness $d_4$, wherein $0.111\lambda \leq d_4 \leq 0.214\lambda$, wherein said second and fourth layers have substantially the same optical thickness;

a fifth layer of the first material having an optical thickness $d_5$, wherein $0.010\lambda \leq d_5 \leq 0.065\lambda$;

and an optical substrate having an index of refraction of from 1.65 to 1.90 at light wavelength λ, and having said five contacting superposed optical film layers disposed thereon with said fifth layer contacting said substrate.

2. A multi-layer nonreflective optical coating on an optical substrate, comprising: seven optical film layers, respectively comprised of a first material having a first index of refraction and a second material having a second index of refraction higher than said first index of refraction, superposed and disposed in contact in the following order;

a first layer of the first material having an optical thickness $d_1$, wherein $0.250\lambda \leq d_1 \leq 0.302\lambda$;

a second layer of the second material having an optical thickness $d_2$, wherein $0.137\lambda \leq d_2 \leq 0.212\lambda$;

a third layer of the first material having an optical thickness $d_3$, wherein $0.029\lambda \leq d_3 \leq 0.100\lambda$;

a fourth layer of the second material having an optical thickness $d_4$, wherein $0.145\lambda \leq d_4 \leq 0.212\lambda$, wherein said second and fourth layers have substantially the same optical thickness;

a fifth layer of the first material having an optical thickness $d_5$, wherein $0.084\lambda \leq d_5 \leq 0.133\lambda$;

a sixth layer of the second material having an optical thickness $d_6$, wherein $0.055\lambda \leq d_6 \leq 0.121\lambda$;

a seventh layer of the first material having an optical thickness $d_7$, wherein $0.070\lambda \leq d_7 \leq 0.121\lambda$;

and an optical substrate having an index of refraction of from 1.45 to 1.75 at light wavelength λ, and having said seven contacting superposed optical film layers disposed thereon with said seventh layer contacting said substrate.

* * * * *